3,228,036
WASTE TREATMENT SYSTEM
Arthur P. Zaske, Utica, Gordon G. Gast, Madison Heights, and Thomas C. Schultz, Detroit, Mich., assignors to Holley Carburetor Company, Warren, Mich., a corporation of Michigan
Filed Jan. 2, 1963, Ser. No. 249,046
8 Claims. (Cl. 4—77)

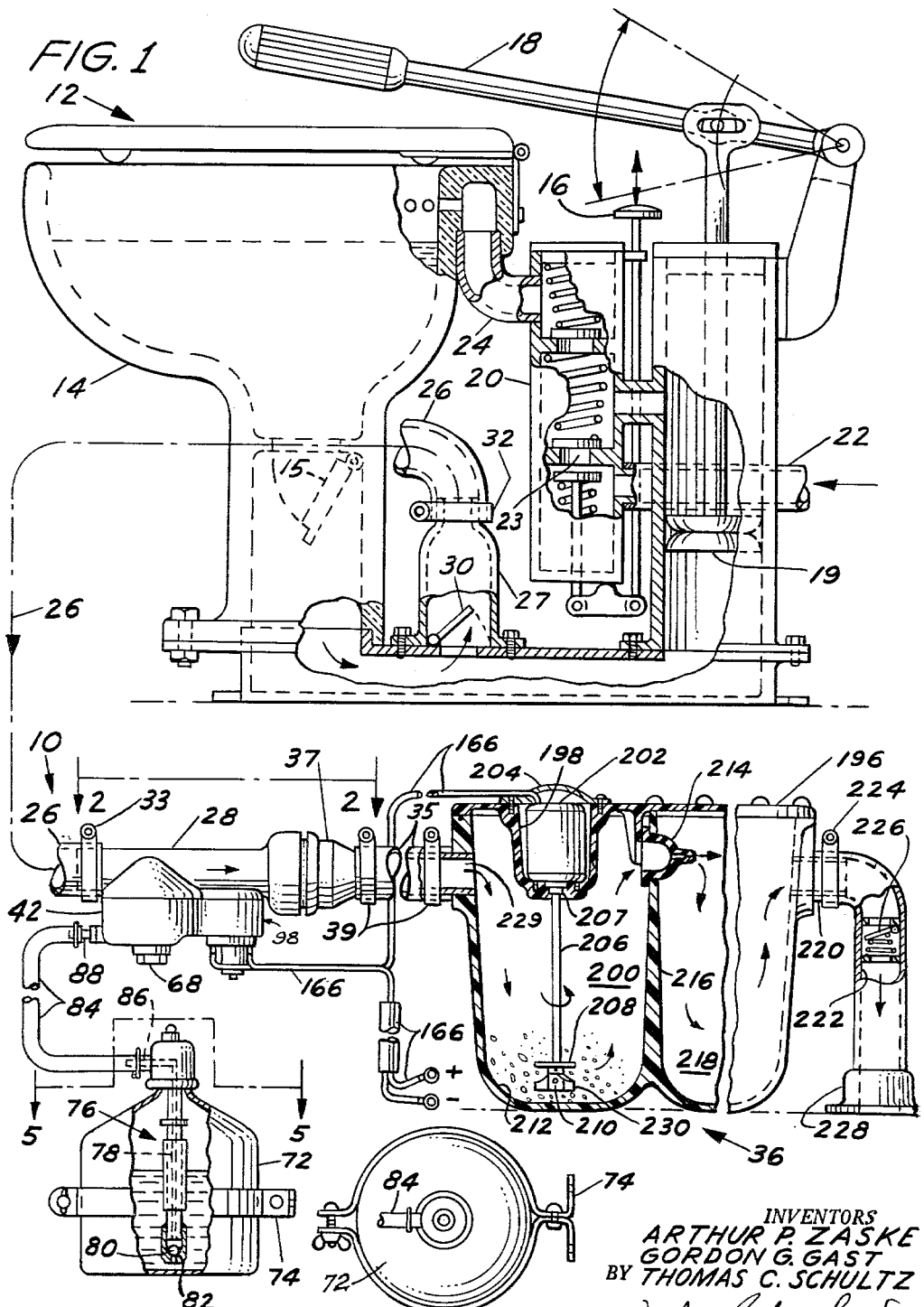

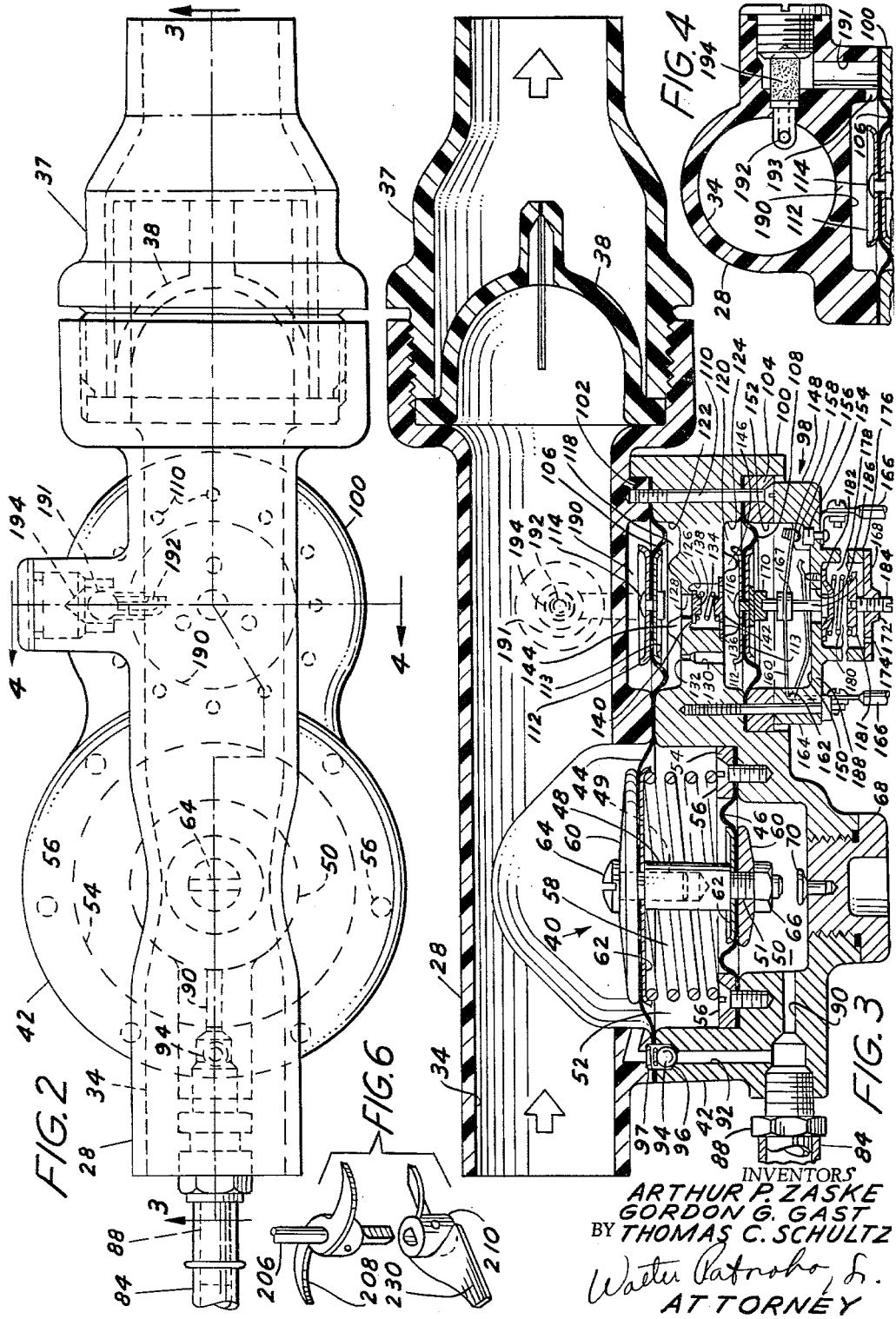

This invention relates generally to apparatus adapted for use with marine or other toilets not connected to a central sewage treatment plant, and more specifically to means for chemically and mechanically processing the waste matter to be discharged therefrom.

In many resort areas where boating has become a popular activity, discharging raw sewage and other waste matter into the water from standard marine toilets having no means for treating the same presents both a nuisance and a danger to public health, and it is reasonable to assume that more laws and regulations preventing it will be enacted and enforced.

Accordingly, a primary object of this invention is to provide novel apparatus for treating such waste matter so as to disperse and render the same bacteriologically harmless prior to its being flushed into the water. It should be understood that apparatus embodying the invention, while primarily intended for use with marine toilets, is not necessarily so limited and may be used in any similar applications.

Another object of this invention is to provide such apparatus which can be readily adapted to any standard marine toilet on the market today, either as original equipment or for subsequent addition thereto.

A further object of this invention is to provide apparatus which continues the chemical treatment of any waste matter remaining in the system between flushing operations.

Another object of the invention is to provide apparatus having a positive pump for the disinfecting chemical, the pump being separate and completely isolated from the water pump.

Still another object of the invention is to provide apparatus in which the entire disinfecting chemical additive system is maintained full at all times so that the chemical is supplied by the initial stroke of the pump therefor.

Another object of the invention is to provide apparatus in which the disinfecting chemical is added at a point between the toilet and the treatment tank so as to prevent entry of the chemical into the water pump and/or the toilet bowl, both of which are highly objectionable for a number of reasons.

Another object of the invention is to provide apparatus having separate cutting and propelling means for the material being treated.

A still further object of this invention is to provide such apparatus which continues to grind the waste material for a predetermined time after flushing the same from the toilet bowl, or after the pressure resulting from flushing subsides.

Other more specific objects and advantages of the invention will become apparent when reference is made to the following description and the accompanying drawings wherein:

FIGURE 1 is a schematic view, with portions thereof cut away and in cross section, of the invention as adapted to a conventional marine toilet.

FIGURE 2 is a top view of a portion of FIGURE 1 taken on the plane of line 2—2 of FIGURE 1 and looking in the direction of the arrows;

FIGURE 3 is a cross-sectional view taken on the plane of line 3—3 of FIGURE 2 and looking in the direction of the arrows;

FIGURE 4 is a fragmentary cross-sectional view taken along the plane of line 4—4 of FIGURE 2 and looking in the direction of the arrows;

FIGURE 5 is a top view taken on the plane of line 5—5 of FIGURE 1 and looking in the direction of the arrows;

FIGURE 6 is a perspective view of the cutter and the impeller shown by FIGURE 1.

As stated above and as shown by FIGURE 1, the apparatus 10 embodying the invention may be employed with a standard marine toilet 12 having a typical bowl 14, bowl valve 15, control valve 16, operating lever 18, piston 19, spring-loaded valving arrangement 20, inlet 22 and conduit 24 communicating between the inlet 22 and the toilet bowl 14.

While some of the elements of the standard marine toilet 12 are specifically referred to above, the details of construction thereof form no part of this invention. Suffice it to say that when the handle 18 and piston 19 are moved upwardly, valve 15 is opened, valve 30 closes by its own weight and waste material from the bowl 14 is drawn into the cylinder below piston 19; at the same time, water in the cylinder above piston 19 is forced through the appropriate passages and into the bowl. When the handle and piston 19 are moved downwardly, the waste material previously drawn from the bowl 14 and into the cylinder below the piston 19 is forced past the valve 30 and to the apparatus 10, the valve 15 being closed at that time; at the same time, assuming that the valve 16 has been opened, water from the inlet 22 is drawn into the cylinder above the piston 19.

A conduit 26 connects the toilet discharge fitting 27, which is normally located at the base of the toilet, with the pressure body 28 of the apparatus 10. A valve 30, normally in the closed position due to its own weight, may be provided in the outlet fitting 27, conduit 26 being fastened to fitting 27 by any suitable means such as a clamp 32 and by similar means 33 to the body 28. The pressure chamber 34 in body 28 communicates between the conduit 26 and a conduit 35 connecting an adapter assembly 37 with a dual compartment tank 36, conduit 35 being connected to the tank 36 and the adapter body 37 by any suitable means such as clamps 39. The adapter assembly 37 is threaded into the body 28 in a manner to retain therein a one-way check valve 38 (FIGURE 3), commonly known as a "joker" valve.

FIGURE 3 illustrates a dual diaphragm pump 40, producing a mechanical advantage for a purpose which will be described later, assembled by the use of a separate housing 42 attached to the pressure body 28 in a manner so that the larger area diaphragm 44 is subjected directly to the pressure in the chamber 34. The smaller diaphragm 46 is connected to the larger diaphragm 44, at a fixed distance therefrom, by a spacer 48 which for convenience of assembly may include internal threads 49 and an externally threaded extension 51. The housing is formed with a stepped cylindrical cavity so that chambers 50 and 52 are provided when the smaller diaphragm 46 is fastened therein by any convenient means such as a plate 54 and screws 56. Spring 58 is positioned in the chamber 52 with one end thereof restrained by the plate 54 so that it urges the larger diaphragm 44 toward the pressure chamber 34. The chamber 52 may be vented to atmospheric pressure. Each of the diaphragms 44 and 46 is supported at the center thereof by washers 60 and 62, and the diaphragms 44 and 46 are caused to move as a unit by virtue of their being fastened together through the spacer 48 by some suitable means such as a screw 64 and a nut 66. A plug 68 including a stop 70 is threadedly inserted into the housing 42 so that the stop 70 is positioned directly in line with the end of the bolt 64.

A disinfecting solution container 72 (FIGURES 1 and 5) is located in the vicinity of the pump 40 and fastened to any rigid portion of the boat, as by a clamp 74. The disinfecting solution container 72 includes a disinfecting fluid supply device 76 for operation in conjunction with the dual diaphragm pump 40. The device 76 may comprise a tubular member 78 inserted into the container 72 and having a ball check valve 80 and seat 82 at the bottom end thereof. A conduit 84 connects the outlet 86 at the top of the tubular member 78 and the inlet 88 in the housing 42, and passage 90 in the housing 42 communicates between the inlet 88 and the chamber 50. A branch passage 92 in the housing 42, including a ball check valve 94 and seat 96, communicates between the passage 90 and the chamber 34 of the pressure body 28. The ball 94 may either be urged toward the seat 96 by resilient means such as spring 97 or rest thereon by its own weight.

As further seen in FIGURE 3, a motor switch assembly 98, which may have a portion 100 thereof formed as a part of the housing 42, is located adjacent the pressure chamber 34 in pressure body 28. Two diaphragms 106 and 108 are confined against the opposite sides of the portion 100 of the housing 42 by an annular surface 102 on the pressure body 28 and by a ring 104, respectively. It is possible, as in this case, that the upper diaphragm 106 may be formed as an extension of the larger diaphragm 44 of the pump 40. The ring 104 may be fastened to the body portion 100 and the body portion 100, in turn, fastened to the pressure body 28 as by screws 110. As usual, each of the diaphragms 106 and 108 is preferably supported by a pair of washers 112 and 113 positioned on the opposite sides thereof, and fastened together by rivets 114 and 116.

The two diaphragms 106 and 108 thus form oppositely disposed chambers 118 and 120 with the annular cavities 122 and 124 formed in the body portion 100. The body portion has formed therein a central passageway having two diameters 126 and 128 and an off-center passage 130 communicating between the two chambers 118 and 120, passage 130 including a calibrated restriction 132. A spring 134, restrained at its one end by a spring retainer 136 fixed in body 100 urges a valve 138 against the seat 140 formed at the junction of the two diameters 126 and 128 of the central passage. The spring retainer 136 includes a plurality of ports 142. Internal stops 144 and 146 may be cast or otherwise formed on the body portion 100 to limit the downward and upward movements of the upper and lower diaphragms 106 and 108, respectively.

A cover 148 formed with a cavity 150 is fastened to the body portion 100 with the plate 104 confined therebetween so as to form the chamber 152 beneath the diaphragm 108. The chamber 152 contains a pair of electrical contacts 154 and 156, the former being affixed to the cover 148. The other contact 156 is fixedly attached to the free end 158 of a flexible strip or blade 160, the other end 162 of which is secured in the wall 164 of the cover 148. Wire leads 166 are fixed in any suitable manner to the fixed contact 154 and to the mounted end 162 of the blade 160. The blade 160 extends through or is otherwise fixed to the collar 167 of a vertically movable rod 168 positioned directly below the center of the diaphragm 108 and adapted to fit, at its upper end, into a retainer 170 attached to the rivet 116.

A cap 172 formed with an atmospheric bleed 174 is fastened to a hollow cylindrical extension 176 which may be formed on the cover 148, thus forming a chamber 178 containing a spring 180. The spring 180 is confined between lower and upper spring seats 181 and 182, the location of the lower stationary seat 181 being manually adjustable, as by an adjusting screw 184, and the upper movable seat 182 being at all times abutted against the rod 168, which extends through an opening 186 in the wall 188.

An additional annular chamber 190 is formed between the wall of the pressure chamber 34 and the upper diaphragm 106. A pair of conduits 191 and 192, the junction of which is fitted with a screen or porous filter 194, provide communication between the pressure chamber 34 and the chamber 190.

The dual compartment tank 36 (FIGURE 1) is covered by a lid 196, the portion of the lid covering the receiving compartment 200 including a centrally located cavity 198 covered by a second lid 204 to provide a chamber enclosing an electric motor 202. The wire leads 166 connect between the motor 202 and a power supply (not shown) through the motor switch assembly 98 so that the motor 202 operates when the contacts 154 and 156 are closed. The motor shaft 206 extends downwardly into the receiving compartment 200 through a suitable seal 207 provided in the bottom wall of the cavity 198, and it has fastened at the free end thereof a cutter 208 (FIGURE 6) and an impeller 210, the latter being purposely positioned adjacent the contoured bottom 212 of the compartment 200.

A one-way check valve 214, similar to the flexible joker valve 38 is provided in the wall 216 between the compartments 200 and 218 near the upper edge thereof. The discharge compartment 218 is formed with an outlet 220 to which an overflow discharge line 222 is connected by any suitable means, such as a clamp 224. The discharge line 222 may include a spring-loaded valve 226 intermediate its ends in the event the tank 36 is located below the water line, and it usually includes a standard seacock 228 at its outlet end which is secured in an opening in the hull of the boat.

The tank inlet port 229, the valve 214 and the outlet port 220 are preferably positioned so that if the dual compartment tank 36 were installed so as to rest on its side they would still be positioned near the top of the chambers 200 and 218.

As seen in FIGURE 6, the impeller 210 includes blades 230 which are shaped in a manner so as to cause the waste solution resulting from the chopping and grinding by the cutter 208 to be thoroughly mixed and recirculated smoothly either toward the contoured bottom 212 of the compartment 200 and thence up the sides of the compartment toward the valve 214 or upwardly from the bottom and directly into the cutter 208.

It is to be understood that all of the component parts of the apparatus 10 which are exposed to the flow of treated waste matter are preferably formed of non-corroding materials, such as suitable plastics.

*Operation*

As a prelude to the detailed description of the operation of the invention, it can be said generally that waste matter is caused to travel from the toilet bowl 14 and into the pressure chamber 34 where the disinfecting chemical is added into the receiving compartment 200 where it is mechanically ground and mixed into the discharge compartment 218 and finally, as a bacteriologically harmless liquid, through the discharge line 222.

As is the case with most standard marine toilets, the marine toilet 14 shown by FIGURE 1 is operated by first raising the valve control 16 so as to open the passage 23 and then pumping the handle 18 up and down a number of times so as to remove the contents of the bowl 14 through the valve 15 and to flush the bowl with water from the water inlet 22, as already described above. Thus, without the use of the apparatus 10, the raw waste material would be discharged back into the lake from which the water was drawn.

Once the apparatus 10 has been installed, lowering of the lever 18 will transfer the waste matter through the outlet valve 30 and into the pressure chamber 34. Any waste matter already in the chamber 34 from the last flushing of the toilet would, of course, be forced under pressure, due to the closing of valve 15 when handle 18 is moved downwardly, through the only outlet, the joker valve 38 located at the end of the pressure chamber 34, and into the receiving compartment 200.

The larger upper diaphragm 44 of the disinfectant pump 40 (FIGURE 3) would, of course, be directly subjected to whatever pressure is produced in the pressure chamber 34 by the downward pressure stroke of the lever 18. Since the smaller diaphragm 46 is fixedly attached to the upper larger diaphragm 44 by the spacer 48, a mechanical advantage results, producing a higher pressure in the chamber 50 below the smaller diaphragm 46. This causes the ball 80 of the ball check valve located at the end of the fluid supply tube 78 in the container 72 (FIGURE 1) to be seated downwardly against the seat 82 and the ball 94 of the ball check valve in the branch conduit 92 (FIGURE 3) to be lifted from its seat 96, thereby forcing the disinfecting solution already contained in the chamber 50 into the pressure chamber 34.

Once the pressure pulse created by the downward movement of the lever 18 subsides, the spring 58 under the larger diaphragm 44 raises the diaphragms 44 and 46 to their static positions shown by FIGURE 3. Raising diaphragm 46 creates a suction in the conduit 84 so as to close the ball 94 against the seat 96 and lift the ball 80 from its seat 82 in the bottom of the container 72, thereby replenishing the supply of disinfecting fluid in the chamber 50 through the conduits 84 and 90. Once chamber 50 and lines 84 and 90 are full of fluid, none can escape due to the ball check 80. In this manner, the chamber 50 is always maintained full of disinfecting fluid for an immediate full charge into pressure chamber 34 on the very next pressure stroke of the lever 18.

It will be noted that the disinfecting solution is introduced by the pump 40 upon the downward pressure stroke of the piston 19 directly into the pressure chamber 34, rather than into the bowl 14 as is the case with some presently proposed systems. This is considered to be important because Clorox and other type disinfecting solutions that may be used for this purpose tend to become spent when exposed to air. It is highly desirable that any waste matter that remains in the system on the toilet side of the joker valve 38 between flushings of the toilet be chemically treated. If the disinfecting solution is added in the bowl, it may very well become spent prior to the next use of the toilet so that it could not be relied upon to provide the necessary disinfecting action the next time the toilet is used.

Additionally, space on moderately sized pleasure craft is at a premium, and the characteristic odor given off by disinfecting fluids would tend too permeate the living quarters if the fluid were present in the bowl 14. There would be other disadvantages, such as the disinfecting solution tending to splash on and corrode exposed parts of the toilet seat, etc.

Some presently proposed systems employ one or the other side of the double acting toilet operating pump to supply the disinfecting fluid. This is highly objectionable because disinfecting fluid tends to corrode the pump and associated valve parts. This is particularly serious when the toilet is located below the water line and the valves in the water inlet are relied upon to prevent sinking of the craft. It should be noted that the invention contemplates a separate pump 40 so that the disinfecting solution cannot corrode the water pump and associated valves.

In addition to the initial chemical treatment of the waste matter in the pressure chamber 34 (FIGURE 3), a mechanical cutting or grinding operation is performed in the receiving compartment 200 of the tank 36 (FIGURE 1) once the waste matter has been forced through the joker valve 38 and prior to its overflow through the second joker valve 214 and into the discharge compartment 218 of the tank 36. This grinding and blending operation is performed by the rotation of the separate cutter 208 and impeller 210 members attached to the motor shaft 206. Rotation of the shaft 206 occurs as a result of the pressure in the pressure chamber 34 caused by pumping the lever 18. That is, the diaphragm 106 of the motor switch assembly 98 is subjected to the fluid pressure in chamber 34 through the conduits 192, 191, 193 and chamber 190 (FIGURE 4). Note in FIGURE 2 that the conduit 192 opens toward the downstream end of the pressure chamber 34, thereby reducing the possibility of its becoming clogged by waste matter.

That portion of the motor switch assembly 98 which is confined between the diaphragms 106 and 108 is a completely enclosed, fluid-filled system. Depression of the diaphragm 106 by the pressure in the upper chamber 190 will force the lower diaphragm 108 downwardly by virtue of the fluid being shifted from the chamber 118 to the chamber 120 through the central passageways 128 and 126, i.e., past the spring loaded valve 138 and through the ports 142. The downward movement of diaphragm 106 will continue until the inner washer 113 of the diaphragm 106 abuts against the stops 144. The associated downward movement of the lower diaphragm 108 results in the member 170 affixed to the lower diaphragm 108 engaging the rod 168 and moving the movable contact 156 fixed on the end of the blade 160, downwardly into contact with the stationary contact 154, thereby completing the circuit through the leads 166 which connect with the electric motor 202. This results in the rotation of the cutter 208, which grinds the waste matter, and the impeller 210, which by reason of its being positioned near the contoured bottom of the compartment 200, mixes or blends the ground waste matter with the disinfecting solution and recirculates the mixture for further thorough cutting and blending and a complete disinfecting action.

It is highly desirable that the grinding and mixing operation in compartment 200 continue for a predetermined length of time, say 8 to 12 seconds, after the pressure in the upper chamber 190 subsides. This is accomplished by the fact that the fluid in the chamber 120 must return to the chamber 118 through the calibrated restriction 132 when the downward flow of fluid has ceased due to the relaxation of pressure in chamber 190 and the valve 138 is again moved against the seat 140 by the spring 134. Calibration of the restriction 132 will, of course, determine the length of time required for this transfer of the fluid, and thus the time that grinding continues. Once the pressure in chamber 190 subsides, the upward movement of the lower diaphragm 108 toward the stops 146 will be effected by the spring 180, which raises the rod 168, and hence the diaphragm 108, against the dashpot effect of the calibrated restriction 132 between the chambers 118 and 120. After the predetermined length of time, when sufficient fluid has been displaced through the calibrated restriction 132, the movable contact 156 would, of course, have been raised off of the stationary contact 154, thereby breaking the circuit and stopping the motor 202.

The adjustment 184 for the spring 180 is provided because the location of the toilet with respect to the water line determines whether there is a positive or negative head on the system. It is desirable that the motor switch 98 be responsive to the rise in pressure in the chamber 34 resulting from the operation of the handle 18, and not to the head pressure. The adjustment 184 is thus employed to vary the pre-load of the spring 180, depending upon the position of the toilet with respect to the water line. It is apparent, however, that the setting of the member 184 may also have some effect on the duration of operation of motor 202.

From the above description, it should be apparent that the invention provides an apparatus 10 which may be used with any standard marine type toilet and which effectively treats waste matter both chemically and mechanically for discharge into the lake or river as a relatively unoffensive and bacteriologically harmless effluent.

A thorough and effective treatment of the waste matter is enhanced by the novel means provided in the system for continually chemically treating any waste matter which might remain in the conduit 26 and pressure chamber 34 after flushing, as well as for grinding and chopping the contents of the receiving compartment 200 when the toilet is flushed and for a predetermined length of time after the pressure build-up in the pressure chamber 34 has subsided, the latter occurring as soon as the flushing cycle is finished.

As stated in the objects of the invention, the apparatus 10 is constructed in a way so as to eliminate the many and real disadvantages of adding disinfectant solution in the toilet bowl itself or at a point in the system where the solution can come into contact with and possibly harm the toilet pump and the valves associated therewith. The single inefficient mixer or cutter provided in prior art systems is replaced by the combination of a separate zero pitch cutter and a separate impeller which together provide separate and efficient cutting and propelling actions.

A novel separate, positive-action disinfecting pump, which is operative in response to a pressure resulting from the operation of the toilet itself and constructed so as to provide a mechanical advantage, supplies a full charge of disinfectant each time the main toilet pump is operated.

Additionally, a novel motor switch assembly responsive only to the pressure resulting from the operation of a toilet starts the motor driving the cutter and impeller and continues the operation thereof for a preselected time interval after the toilet has been flushed. The bottom of the receiving compartment is contoured in such a way as to eliminate corners in which waste matter does collect and enables the impeller located near the contoured bottom to efficiently recirculate the material back into the cutter.

Lastly, the inlet, transfer and outlet passages in the two-compartment container are located near the top and one side of the container so that the container may be placed either vertically or horizontally, depending upon the space available, and still maintain these passages near the top of the container.

While but one modification of the invention has been illustrated and described, other modifications may, of course, be possible within the scope of the appended claims.

What we claim as our invention is:

1. The combination of a toilet of the type having an outlet and a manually-operated waste pump creating a hyperatmosphere pressure upon the discharge stroke thereof and a waste treatment system for said toilet, said system comprising a conduit extending between said outlet from said toilet and the discharge point of said system, said conduit including: a valve, said valve being closed by the suction stroke of said waste pump and opened by the discharge stroke thereof, a pressure chamber adjacent the outlet of said valve and having a separate pressure-responsive disinfectant pump and a pressure-responsive electrical switch formed in the wall thereof, said pump discharging into said pressure chamber, a check valve located downstream of said switch, said check valve being opened by the discharge stroke of said waste pump, a waste treatment tank located downstream of said check valve, said tank including a first receiving compartment and a second discharge compartment, an electric motor and attached cutter mounted in said receiving tank, a common wall positioned between said compartments and having a check valve therein, said check valve being opened by the discharge stroke of said waste pump, and a one-way valve disposed near the discharge point of said system and adapted to open only upon the discharge stroke of said waste pump, said switch serving to control the operation of said electric motor.

2. The combination of a toilet of the type having an outlet and a waste pump creating a hyperatmospheric pressure upon the discharge stroke thereof and a waste treatment system for said toilet, said system comprising a conduit extending between said outlet from said toilet and the discharge point of said system, said conduit including: a valve, said valve being closed by the suction stroke of said waste pump and opened by the discharge stroke thereof, a pressure chamber located at the outlet side of said valve and communicating with a separate pressure-responsive disinfectant pump and a pressure-responsive electrical switch, said pump discharging into said pressure chamber, a check valve located at the downstream side of said switch and opened by the discharge stroke of said waste pump, a waste treatment tank located at the downstream side of said check valve, said tank including a first receiving compartment and a second discharge compartment, an electric motor and attached cutter mounted in said receiving tank, a common wall positioned between said compartments and having a check valve therein, said check valve being opened by the discharge stroke of said waste pump, and a one-way valve disposed near the discharge point of said system, said one-way valve being opened by the discharge stroke of said waste pump, said switch serving to control the operation of said electric motor.

3. The combination recited in claim 2, wherein said pressure-responsive electrical switch is provided with means for maintaining said switch closed for a predetermined time interval after the initial closing thereof.

4. A waste treatment system for a toilet having a lever-actuated waste pump, said system comprising a pressure chamber filled under hyperatmospheric pressure with waste material from said toilet upon actuation of said lever; a separate pressure-responsive pump positioned adjacent to and subject to the pressure in said pressure chamber; a container containing a supply of disinfectant solution; a first conduit communicating between said container and said pressure-responsive pump and a branch conduit communicating between said first conduit and said pressure chamber, a check valve in each of said conduits for alternate operation by said pressure-responsive pump; a waste treatment compartment, a conduit communicating between said compartment and said pressure chamber, said compartment including an inlet valve, an outlet valve, an electric motor, and separate zero pitch cutter and variable pitch impeller elements driven by said motor for grinding said waste material and directing said waste material upwardly toward said cutter, respectively; and a motor switch adjacent to and responsive to an increase in pressure in said pressure chamber for starting and continuing the operation of said motor for a predetermined length of time after said lever has been actuated.

5. The structure as defined in claim 4 wherein said pressure-responsive pump comprises a larger diaphragm directly subjected to the pressure in said pressure chamber, a smaller diaphragm directly connected for movement with said larger diaphragm at a fixed distance therefrom, a chamber between said smaller diaphragm and said first conduit, said smaller diaphragm resulting in a mechanical advantage for forcing said solution from said chamber and said first and branch conduits into said pressure chamber.

6. The structure as defined in claim 4 wherein said motor switch comprises a pair of diaphragms forming two chambers with an intermediate wall, one of said diaphragms being subjected to the pressure in said pressure chamber, valve means mounted in said wall for at times providing communication therethrough between said chambers, a fixed restriction for providing continual communication between said chambers, a first contact point movable by the other of said diaphragms, a second fixed contact point for at times being contacted by said movable contact point and thereby causing the operation of said electric motor for a predetermined length of time after the one of said diaphragms is subjected to pressure.

7. A waste treatment system for a toilet having a lever-actuated waste pump, said system comprising a pressure chamber filled under hyperatmospheric pressure with waste material from said toilet upon actuation of said lever, a separate disinfectant pump operated by the pressure in said pressure chamber; a container containing a supply of disinfectant solution; a first conduit communicating between said container and said disinfectant pump and a branch conduit communicating between said first conduit and said pressure chamber, a check valve in each of said conduits, said check valves being alternately opened and closed by operation of said disinfectant pump and both being closed when said pump is not operated, a waste treatment compartment, an additional conduit connected between said compartment and said pressure chamber, said compartment including an inlet valve, an outlet valve, and separate electric motor driven zero pitch cutter and variable pitch impeller elements for grinding said waste material and directing said waste material upwardly toward said cutter, respectively; and a motor switch responsive to an increase in pressure in said pressure chamber for starting and stopping said motor.

8. A waste treatment system for a toilet having a lever-actuated waste pump, said system comprising a pressure chamber, filled under hyperatmospheric pressure with waste material from said toilet upon actuation of said lever; a separate pressure-responsive pump positioned adjacent to and subject to the pressure in said pressure chamber, said pump including a larger diaphragm directly subjected to the pressure in said pressure chamber, a smaller diaphragm directly connected for movement with said larger diaphragm at a fixed distance therefrom, and a chamber between said smaller diaphragm and said first conduit, said smaller diaphragm resulting in a mechanical advantage for forcing said solution from said chamber and said first and branch conduits into said pressure chamber; a container containing a supply of disinfectant solution; a first conduit communicating between said container and said pressure-responsive pump; a branch conduit communicating between said first conduit and said pressure chamber; a check valve in each of said conduits for alternate operation by said pressure-responsive pump; a waste treatment compartment, a conduit communicating between said compartment and said pressure chamber, said compartment including an inlet valve, an outlet valve, an electric motor, and separate zero pitch cutter and variable pitch impeller elements driven by said motor for grinding said waste material and directing said waste material upwardly toward said cutter, respectively; and a motor switch adjacent to and responsive to an increase in pressure in said pressure chamber for starting and continuing the operation of said motor for a predetermined length of time after said lever has been actuated, said motor switch including a pair of diaphragms forming two chambers with an intermediate wall, one of said diaphragms being subjected to the pressure in said pressure chamber, valve means mounted in said wall for at times providing communication therethrough between said chambers, a fixed restriction for providing continual communication between said chambers, a first contact point movable by the other of said diaphragms, and a second fixed contact point for at times being contacted by said movable contact point and thereby causing the operation of said electric motor for a predetermined length of time after the one of said diaphragms is subjected to pressure.

References Cited by the Examiner
UNITED STATES PATENTS

| | | | |
|---|---|---|---|
| 2,350,938 | 6/1944 | Sparrow | 200—83 |
| 2,675,758 | 4/1954 | Hughes | 103—152 |
| 2,777,028 | 1/1957 | Kendall et al. | 200—83 |
| 2,865,028 | 12/1958 | Petenaude | 4—90 |
| 3,044,077 | 7/1962 | Belden | 4—10 |
| 3,055,994 | 9/1962 | Lundeen | 200—34 |

LAVERNE D. GEIGER, *Primary Examiner.*

EDWARD V. BENHAM, LEWIS J. LENNY,
*Examiners.*